Figure 1:
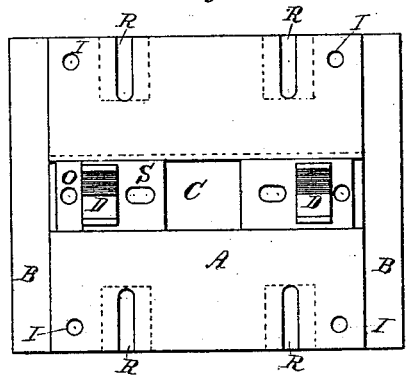
Figure 2:
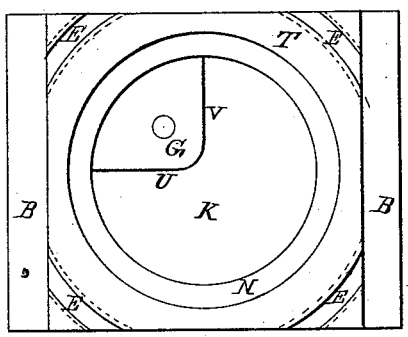
Figure 3:
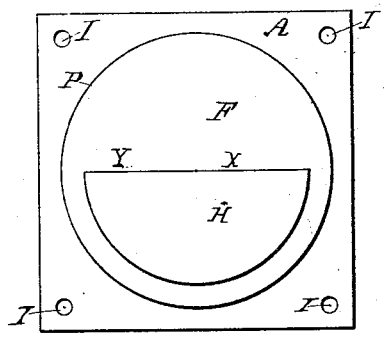
Figure 4:
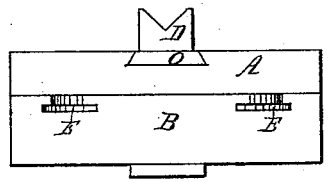

J. C. MULBERRY.
Planer-Chuck.

No. 167,618.

Patented Sept. 14, 1875.

Witnesses;

Cornelius R. Barnes
Edwin H Barbugam

Inventor;

James C. Mulberry

UNITED STATES PATENT OFFICE.

JAMES C. MULBERRY, OF GRAND RAPIDS, MICHIGAN, ASSIGNOR OF ONE-HALF HIS RIGHT TO FRANCES A. BARNES.

IMPROVEMENT IN PLANER-CHUCKS.

Specification forming part of Letters Patent No. 167,618, dated September 14, 1875; application filed June 3, 1875.

*To all whom it may concern:*

Be it known that I, JAMES C. MULBERRY, of Grand Rapids, Kent county, Michigan, have invented an Improved Adjustable Chuck, of which the following is a specification:

My invention relates to the construction of a chuck for the purpose of holding, at any desired angle for planing, cylinders, cross-heads, steam-chest covers, pillow-blocks, elbow-pipes, or anything in iron, brass, metal, composition, or wood required to be planed at different angles.

In the drawing, A represents the upper plate of the adjustable chuck; B, the base or lower plate. N and K represent a double socket, the lower part K being one-fourth filled by right-angular piece G. T is that portion of the lower plate upon which P of the upper plate rests and turns. E are grooves in base B, in which heads of bolts rest which pass through holes I in upper plate A, to hold, by means of burrs, the plate A and base B together and in proper position. F represents the circular part of plate A, which, when P rests upon T, fills the N portion of socket N K, while the half-circular part H fills all of space K not occupied by piece G, less one-fourth part. C is a groove in upper plate, in which V-shaped slides D are inserted. S are slots in base of slides D for the reception of bolts, which may be screwed into bottom of groove c to hold slides D in any desired positions. Slides D may be moved apart or toward each other by means of a right and-left-hand screw, or otherwise. R are grooves, slots, holes, or other device in upper plate A, for the purpose of fastening such shaped material for planing as cannot properly be held in position by slides D.

When for any purpose it is desirable that the entire surface of plate A should be made smooth, the slides D may be removed and a perfect-fitting plate slid in exactly-fitting groove C, thereby leaving the upper surface of plate A perfectly smooth.

To operate my chuck I attach base B to the planer by means of the slide on under side, in usual manner. Place plate A upon base B so that circle F shall rest on and fill space N, and half-circle H shall half fill space K, with X end of straight side of H resting against U side of right-angular piece G. With the chuck in that position, (slides D being in position in groove C at such distance apart as to accommodate the length of material to be planed, and material being in Vs of slides D, and held to place by bolts in holes O and proper clamps,) one portion of a right-angular piece is in position to be planed, and when completed the upper plate A is turned one-fourth around until Y end of straight side of half-circular piece H rests against the V side of right-angular piece G. When the other part of right-angular material to be planed is put in Vs D they are in exact position to be planed at a right angle without further difficulty.

What I claim to have invented, and desire patented, is—

The combination of the base B, to be attached to planer-bed, and having the double sockets N K, right-angular piece G, and plane surface T with the plate A, having the projecting circular surface F and semicircular piece H, and carrying the chuck-jaws, substantially as described and for the purpose set forth.

JAMES C. MULBERRY.

Witnesses:
 CORNELIUS R. BARNES,
 EDWIN A. BURLINGAME.